US009229155B2

(12) United States Patent
Yu et al.

(10) Patent No.: US 9,229,155 B2
(45) Date of Patent: Jan. 5, 2016

(54) SIDE-EDGE BACKLIGHT MODULE

(71) Applicant: Shenzhen China Star Optoelectronics Technology Co., Ltd., Shenzhen, Guangdong (CN)

(72) Inventors: Gang Yu, Guangdong (CN); Shihhsiang Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 153 days.

(21) Appl. No.: 14/129,981

(22) PCT Filed: Nov. 27, 2013

(86) PCT No.: PCT/CN2013/087885
§ 371 (c)(1),
(2) Date: Dec. 29, 2013

(87) PCT Pub. No.: WO2015/070486
PCT Pub. Date: May 21, 2015

(65) Prior Publication Data
US 2015/0177448 A1    Jun. 25, 2015

(30) Foreign Application Priority Data

Nov. 15, 2013   (CN) .......................... 2013 1 0574089

(51) Int. Cl.
*F21V 8/00* (2006.01)
(52) U.S. Cl.
CPC ............ *G02B 6/0085* (2013.01); *G02B 6/0001* (2013.01); *G02B 6/009* (2013.01); *G02B 6/0073* (2013.01); *G02B 6/0091* (2013.01)
(58) Field of Classification Search
CPC ............ G02F 1/133615; G02B 6/0085; G02B 6/0001; G02B 6/0073; G02B 6/009; G02B 6/0091
See application file for complete search history.

(56) References Cited

U.S. PATENT DOCUMENTS

2006/0104090 A1* 5/2006 Lengyel et al. ............... 362/612
2011/0025942 A1* 2/2011 Lee .................................. 349/58
2011/0310331 A1* 12/2011 Heo et al. ........................ 349/64

FOREIGN PATENT DOCUMENTS

| CN | 1716041 A | 1/2006 |
| CN | 101988995 A | 3/2011 |
| CN | 202048457 U | 11/2011 |
| CN | 102401332 A | 4/2012 |
| CN | 102494276 A | 6/2012 |
| JP | 2007012416 A | 1/2007 |
| KR | 20120072958 A | 7/2012 |

* cited by examiner

*Primary Examiner* — Mary Ellen Bowman
(74) *Attorney, Agent, or Firm* — Andrew C. Cheng

(57) ABSTRACT

The present invention provides a side-edge backlight module, which includes: a backplane (2), a backlight source (4) mounted in the backplane (2), and a light guide plate (6) mounted in the backplane (2). The backlight source (4) includes a circuit board (42), a plurality of LED lights (44) mounted to and electrically connected with the circuit board (42), a plurality of vertical heat dissipation boards (46) mounted to the circuit board (42) and arranged between the LED lights (44), and horizontal heat dissipation boards (48) perpendicularly connected to the vertical heat dissipation boards (46). The horizontal heat dissipation boards (48) are mounted to the backplane (2). By mounting the vertical heat dissipation boards to the circuit board of the backlight source and mounting the horizontal heat dissipation boards to the bottom board of the backplane, with the horizontal heat dissipation boards and the vertical heat dissipation boards being jointed to or engaging with each other, the side-edge backlight module of the present invention effectively enhances the heat dissipation performance. Further, the vertical heat dissipation boards are arranged between adjacent LED lights and are located on the same side of the circuit board as the LED lights so as to further enhance the heat dissipation performance and thereby improving the quality of the side-edge backlight module.

15 Claims, 7 Drawing Sheets

SIDE-EDGE BACKLIGHT MODULE

BACKGROUND OF THE INVENTION

1. Field of the Invention

The present invention relates to the field of flat panel displaying, and in particular to a side-edge backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal display panel.

Referring to FIG. 1, the side-edge backlight module comprises: a backplane 100, a reflector plate 200 arranged in the backplane 100, a light guide plate 300 arranged on the reflector plate 200, a backlight source 400 arranged in the backplane 100, and a heat dissipation board 500 arranged between the backlight source 400 and the backplane 100. The backplane 100 comprises a bottom board 102 and side boards 104 connected to the bottom board 102. The backlight source 400 is attached via thermal paste (not shown) to the heat dissipation board 500. The heat dissipation board 500 is generally an aluminum board, a copper board, or a graphite patch, which is fixed by screws to the bottom board 102 of the backplane 100. Heat generated by the backlight source 400 is transmitted through the heat dissipation board 500 to the bottom board 102 of the backplane 100 and heat exchange is then performed through the backplane 100 with the surrounding atmosphere to realize heat dissipation. However, the thermal conductivity coefficient of the thermal paste is not great so that the heat dissipation performance of the backlight module is not good and the quality of the backlight module is thus affected.

SUMMARY OF THE INVENTION

An object of the present invention is to provide a side-edge backlight module, which directly conducts heat from a circuit board to a backplane for dissipation of the heat, thereby enhancing the performance of heat dissipation and reducing the material used in the path of heat dissipation.

To achieve the above object, the present invention provides a side-edge backlight module, which comprises: a backplane, a backlight source mounted in the backplane, and a light guide plate mounted in the backplane. The backlight source comprises a circuit board, a plurality of LED (Light-Emitting Diode) lights mounted to and electrically connected with the circuit board, a plurality of vertical heat dissipation boards mounted to the circuit board and arranged between the LED lights, and a horizontal heat dissipation board unit perpendicularly connected to the vertical heat dissipation boards. The horizontal heat dissipation board being mounted on the backplane.

The backplane comprises a bottom board and a plurality of side boards perpendicularly connected to the bottom board so that the bottom board and the side boards define a receiving space. The backlight source and the light guide plate are received in the receiving space.

The circuit board of the backlight source is mounted to the side boards and the horizontal heat dissipation board unit is mounted to the bottom board of the backplane.

The light guide plate comprises a bottom surface facing the bottom board of the backplane, a top surface arranged opposite to the bottom surface, and a plurality of side surfaces between the bottom surface and the top surface. The plurality of side surfaces includes at least a light incidence surface. The backlight source is mounted to the side boards to correspond to the light incidence surface.

The plurality of vertical heat dissipation boards and the horizontal heat dissipation board unit are integrally formed with each other.

The horizontal heat dissipation board unit comprises the same number of horizontal heat dissipation boards as the vertical heat dissipation boards and each of the horizontal heat dissipation boards forms an L-shaped heat dissipation assembly with a corresponding one of the vertical heat dissipation boards.

The horizontal heat dissipation board unit comprises a single horizontal heat dissipation board. The plurality of vertical heat dissipation boards extends from an edge of the horizontal heat dissipation board in a direction substantially perpendicular to the horizontal heat dissipation board.

The horizontal heat dissipation board unit comprises a single horizontal heat dissipation board. The plurality of vertical heat dissipation boards and the horizontal heat dissipation board are formed separately. The plurality of vertical heat dissipation boards is mounted to the circuit board of the backlight source and arranged between the LED lights and the horizontal heat dissipation board is mounted to the backplane, whereby when the circuit board and the horizontal heat dissipation board are mounted to the backplane, the horizontal heat dissipation board and the vertical heat dissipation boards are in contact engagement with each other.

The side-edge backlight module further comprises a reflector plate arranged between the light guide plate and the backplane and an optic film assembly arranged on the light guide plate.

The horizontal heat dissipation board unit and the vertical heat dissipation boards are made of aluminum.

The present invention also provides a side-edge backlight module, which comprises: a backplane, a backlight source mounted in the backplane, and a light guide plate mounted in the backplane, the backlight source comprising a circuit board, a plurality of LED (Light-Emitting Diode) lights mounted to and electrically connected with the circuit board, a plurality of vertical heat dissipation boards mounted to the circuit board and arranged between the LED lights, and a horizontal heat dissipation board unit perpendicularly connected to the vertical heat dissipation boards, the horizontal heat dissipation board being mounted on the backplane;

wherein the backplane comprises a bottom board and a plurality of side boards perpendicularly connected to the bottom board so that the bottom board and the side boards define a receiving space, the backlight source and the light guide plate being received in the receiving space;

wherein the circuit board of the backlight source is mounted to the side boards, the horizontal heat dissipation board unit being mounted to the bottom board of the backplane;

wherein the light guide plate comprises a bottom surface facing the bottom board of the backplane, a top surface arranged opposite to the bottom surface, and a plurality of side surfaces between the bottom surface and the top surface, the plurality of side surfaces including at least a light incidence surface, the backlight source being mounted to the side boards to correspond to the light incidence surface;

further comprising a reflector plate arranged between the light guide plate and the backplane and an optic film assembly arranged on the light guide plate; and wherein the horizontal heat dissipation board unit and the vertical heat dissipation boards are made of aluminum.

The plurality of vertical heat dissipation boards and the horizontal heat dissipation board unit are integrally formed with each other.

The horizontal heat dissipation board unit comprises the same number of horizontal heat dissipation boards as the vertical heat dissipation boards and each of the horizontal heat dissipation boards forming an L-shaped heat dissipation assembly with a corresponding one of the vertical heat dissipation boards.

The horizontal heat dissipation board unit comprises a single horizontal heat dissipation board. The plurality of vertical heat dissipation boards extends from an edge of the horizontal heat dissipation board in a direction substantially perpendicular to the horizontal heat dissipation board.

The horizontal heat dissipation board unit comprises a single horizontal heat dissipation board. The plurality of vertical heat dissipation boards and the horizontal heat dissipation board are formed separately. The plurality of vertical heat dissipation boards are mounted to the circuit board of the backlight source and arranged between the LED lights and the horizontal heat dissipation board is mounted to the backplane, whereby when the circuit board and the horizontal heat dissipation board are mounted to the backplane, the horizontal heat dissipation board and the vertical heat dissipation boards are in contact engagement with each other.

The efficacy of the present invention is that the present invention provides a side-edge backlight module, which comprises vertical heat dissipation boards mounted to a circuit board of a backlight source and horizontal heat dissipation board(s) mounted to the bottom board of the backplane with the horizontal heat dissipation board(s) and the vertical heat dissipation boards being jointed to or engaging with each other so as to effectively enhance the heat dissipation performance. Further, the vertical heat dissipation boards are arranged between adjacent LED lights and are located on the same side of the circuit board as the LED lights so as to further enhance the heat dissipation performance and thereby improving the quality of the side-edge backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
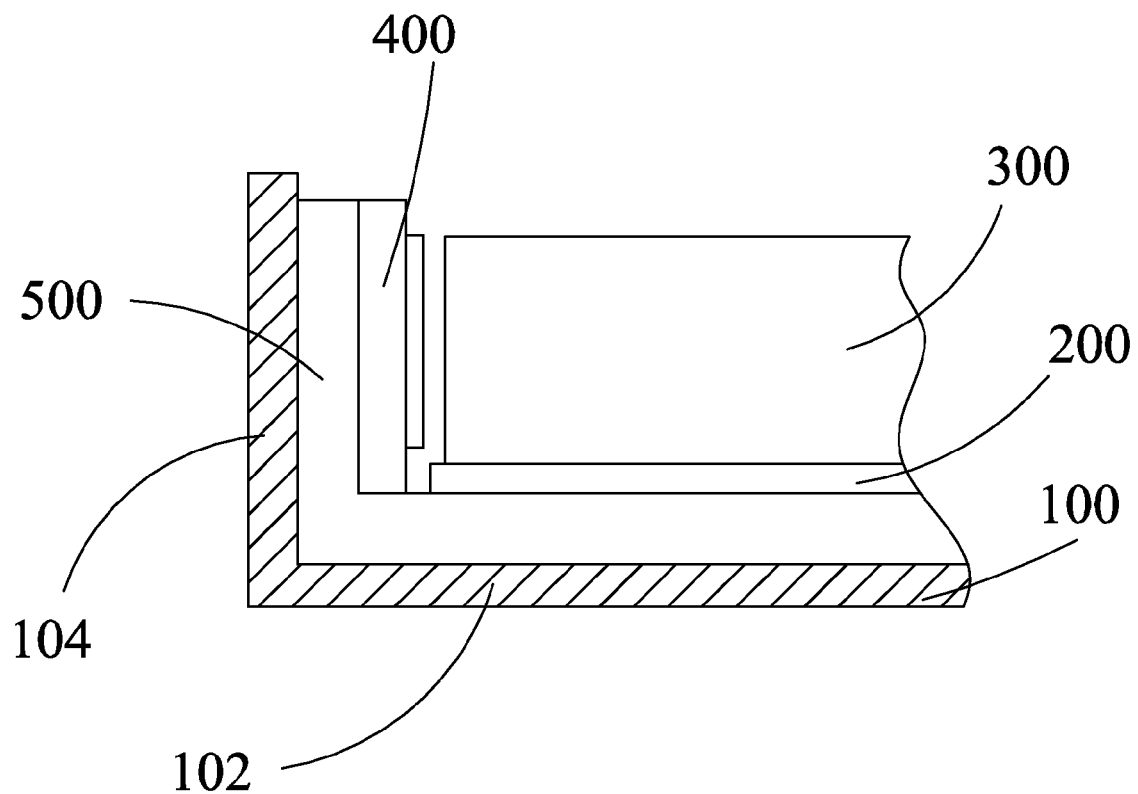
FIG. 1 is a schematic view showing the structure of a conventional side-edge backlight module.
Figure 2:
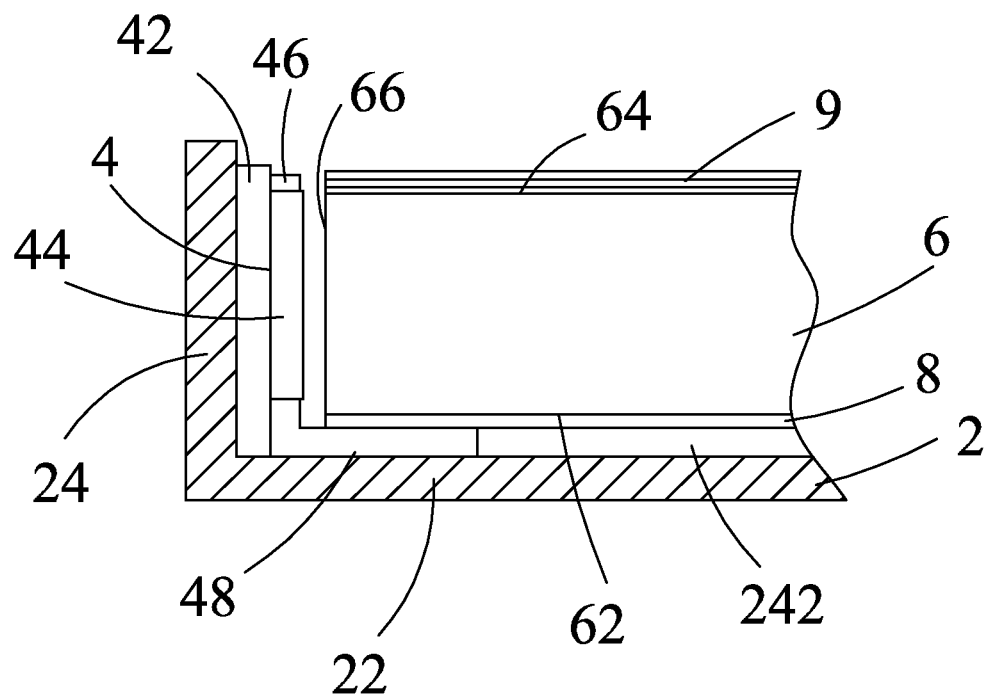
FIG. 2 is a schematic view showing the structure of a first embodiment of a side-edge backlight module according to the present invention.
Figure 3:
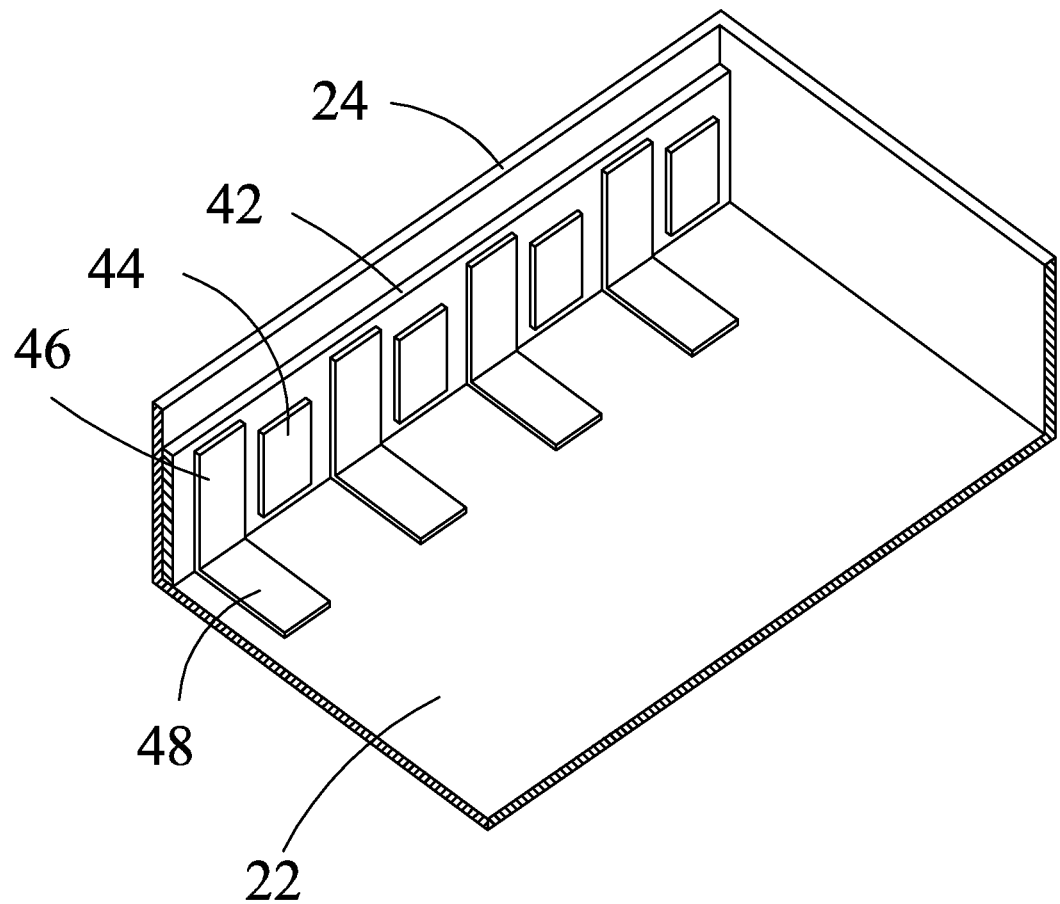
FIG. 3 is a perspective view of a backlight source of FIG. 2 mounted in a backplane.

Referring to FIGS. 2 and 3, the present invention provides a side-edge backlight module, which comprises: a backplane 2, a backlight source 4 mounted in the backplane 2, a light guide plate 6 mounted in the backplane 2, a reflector plate 8 arranged between the light guide plate 6 and the backplane 2, and an optic film assembly 9 arranged on the light guide plate 6. The backlight source 4 comprises a circuit board 42, a plurality of light-emitting diode (LED) lights 44 mounted to and electrically connected with the circuit board 42, a plurality of vertical heat dissipation boards 46 mounted to the circuit board 42 and arranged between the LED lights 44, and horizontal heat dissipation boards 48 respectively and perpendicularly connected to the vertical heat dissipation boards 46. The horizontal heat dissipation boards 48 are mounted on the backplane 2. The horizontal heat dissipation boards 48 and the vertical heat dissipation boards 46 are both made of aluminum. Since the vertical heat dissipation boards 46 are arranged between the LED lights 44 and are located on the same side of the circuit board 42 as the LED lights 44, heat dissipation performance can be effectively enhanced to thereby improve the quality of the side-edge backlight module.

Specifically, the backplane 2 comprises a bottom board 22 and a plurality of side boards 24 perpendicularly connected to the bottom board 22. The bottom board 22 and the side boards 24 collectively define a receiving space 242. The backlight source 4 and the light guide plate 6 are received in the receiving space 242. The light guide plate 6 comprises a bottom surface 62 facing the bottom board 22 of the backplane 2, a top surface 64 arranged opposite to the bottom surface 62, and a plurality of side surfaces connecting between the bottom surface 62 and the top surface 64. The plurality of side surfaces includes at least a light incidence surface 66. The circuit board 42 of the backlight source 4 is fixedly mounted to the side boards 24 to correspond to the light incidence surface 66. The horizontal heat dissipation boards 48 are mounted to the bottom board 22 of the backplane 2.

Referring to FIG. 3, in the instant embodiment, the plurality of vertical heat dissipation boards 46 are each integrally formed with the corresponding horizontal heat dissipation board 48 so that the horizontal heat dissipation boards 48 and the vertical heat dissipation boards 46 are of the same number and each of the horizontal heat dissipation boards 48 and the corresponding vertical heat dissipation board 46 collectively form an L-shaped heat dissipation assembly.

A specific process of mounting is as follows. The vertical heat dissipation boards 46 of the heat dissipation assemblies are first fixedly attached to the circuit board 42 of the backlight source 4. Then, the circuit board 42 is mounted to the side boards 24 of the backplane 2 in such a way that the horizontal heat dissipation boards 48 are set in contact engagement with the bottom board 22 of the backplane 2. Then, the horizontal heat dissipation boards 48 and the bottom board 22 are fixedly connected to each other. Alternatively, the vertical heat dissipation boards 46, the circuit board 42, and the side boards 24 are assembled together first and then, the horizontal heat dissipation boards 48 and the bottom board 22 are fixedly connected together. Both ways achieve the technical result of the present invention.

Figure 4:
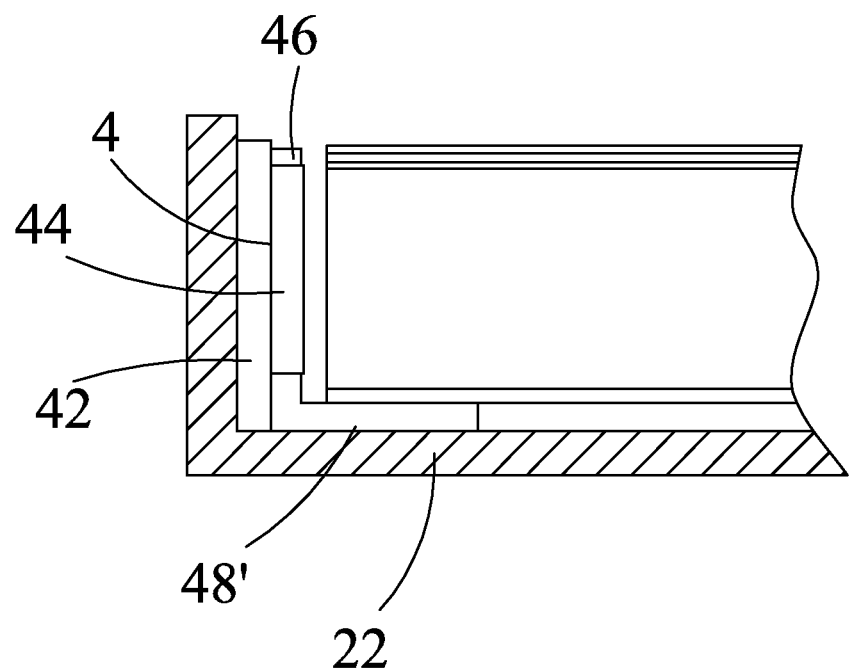
FIG. 4 is a schematic view showing the structure of a second embodiment of a side-edge backlight module according to the present invention.
Figure 5:
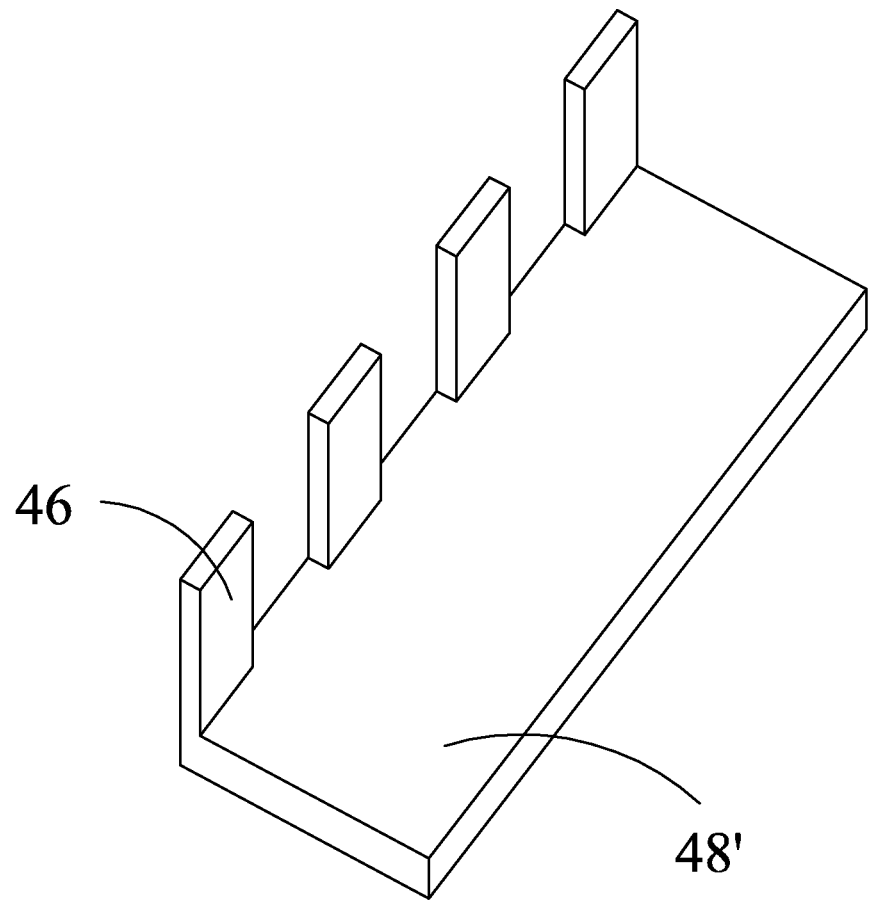
FIG. 5 is a perspective view of a heat dissipation board of FIG. 4.

Referring to FIG. 4, which is a schematic view showing the structure of a second embodiment of the side-edge backlight module of the present invention, in the instant embodiment, a single sheet of horizontal heat dissipation board 48' is provided and a plurality of vertical heat dissipation boards 46 extending from an edge of the horizontal heat dissipation board 48' in a direction perpendicular to the horizontal heat dissipation boards 48' (as shown in FIG. 5). A heat dissipation assembly that is formed of such an arrangement has an enlarged horizontal heat dissipation board 48' so as to provide a bettered effect of heat dissipation. However, Due to the horizontal heat dissipation board 48' being enlarged, compared to the side-edge backlight module of the first embodiment, the side-edge backlight module of the instant embodiment has an increased weight.

Figure 6:
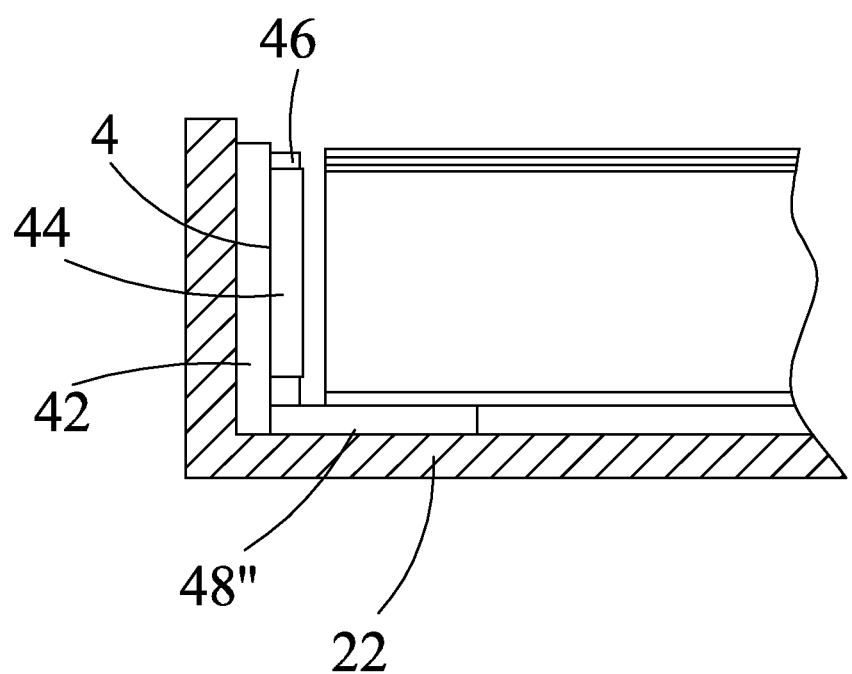
FIG. 6 is a schematic view showing the structure of a third embodiment of a side-edge backlight module according to the present invention.
Figure 7:
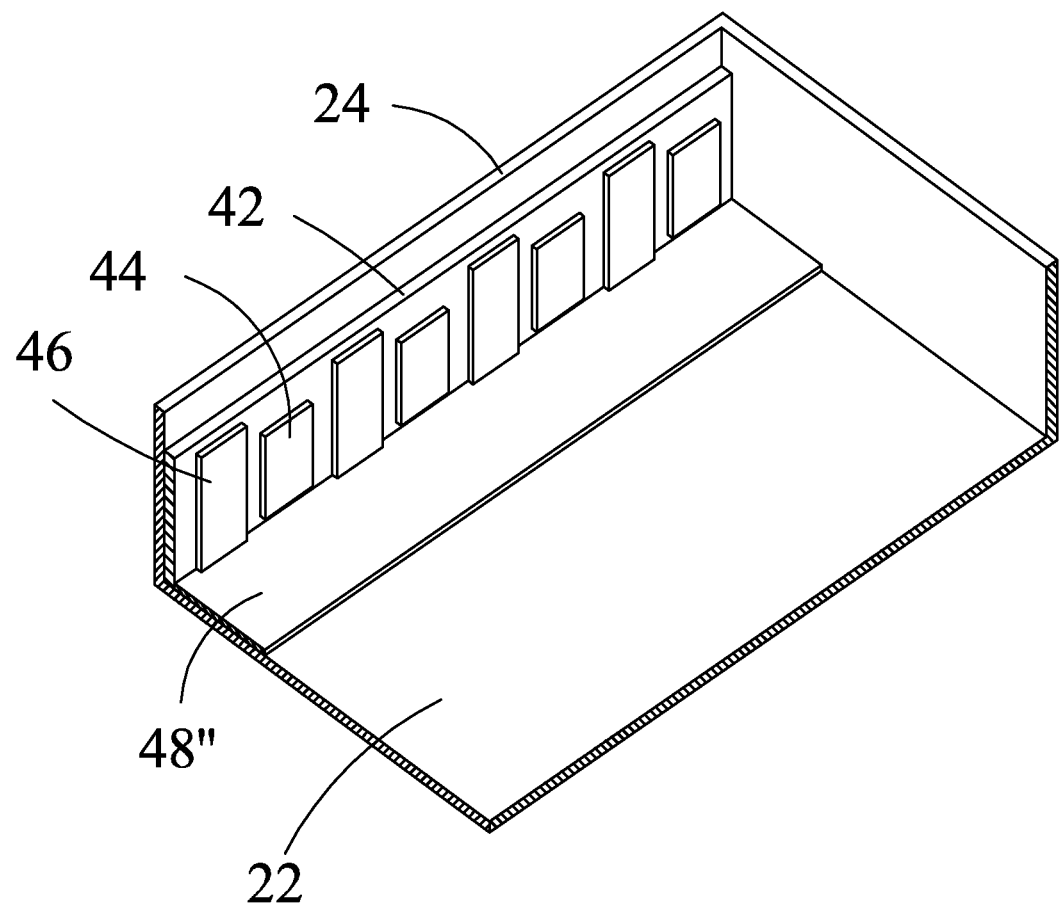
FIG. 7 is a perspective view of a backlight source of FIG. 6 mounted in a backplane.

Referring to FIG. 6, which is a schematic view showing the structure of a third embodiment of the side-edge backlight module of the present invention, in the instant embodiment, a single sheet of horizontal heat dissipation board 48" is provided and a plurality of vertical heat dissipation boards 46 is formed separate from the horizontal heat dissipation board 48" (as shown in FIG. 7). The plurality of vertical heat dissipation boards 46 are fixedly mounted to the circuit board 42 of the backlight source 4 and are respectively located between the LED lights 44. The horizontal heat dissipation board 48" is fixedly mounted to the backplane 2 in such a way that when the circuit board 42 and the horizontal heat dissipation board 48" are respectively mounted to the backplane 2, the horizontal heat dissipation board 48" is in contact engagement with the vertical heat dissipation boards 46. A heat dissipation assembly that is formed of such an arrangement has an advantage of being flexible in assembling or replacing the vertical heat dissipation boards 46 and being easy to change the size of the horizontal heat dissipation board 48" according to the desired result of heat dissipation so as to achieve a desired performance of heat dissipation.

In summary, the present invention provides a side-edge backlight module, which comprises vertical heat dissipation boards mounted to a circuit board of a backlight source and horizontal heat dissipation board(s) mounted to the bottom board of the backplane with the horizontal heat dissipation board(s) and the vertical heat dissipation boards being jointed to or engaging with each other so as to effectively enhance the heat dissipation performance. Further, the vertical heat dissipation boards are arranged between adjacent LED lights and are located on the same side of the circuit board as the LED lights so as to further enhance the heat dissipation performance and thereby improving the quality of the side-edge backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A side-edge backlight module, comprising: a backplane, a backlight source mounted in the backplane, and a light guide plate mounted in the backplane, the backlight source comprising a circuit board, a plurality of LED (Light-Emitting Diode) lights mounted to and electrically connected with the circuit board, a plurality of vertical heat dissipation boards mounted to the circuit board and arranged between the LED lights, and a horizontal heat dissipation board unit perpendicularly connected to the vertical heat dissipation boards, the horizontal heat dissipation board unit being mounted on the backplane;

wherein the horizontal heat dissipation board unit has a surface exposed for dissipating heat.

2. The side-edge backlight module as claimed in claim 1, wherein the backplane comprises a bottom board and a plurality of side boards perpendicularly connected to the bottom board so that the bottom board and the side boards define a receiving space, the backlight source and the light guide plate being received in the receiving space, the exposed surface of the horizontal heat dissipation board unit being located in the receiving space to dissipate heat into the receiving space of the backplane.

3. The side-edge backlight module as claimed in claim 2, wherein the circuit board of the backlight source is mounted to the side boards, the horizontal heat dissipation board unit being mounted to the bottom board of the backplane and extending in a direction away from the side boards and into the receiving space of the backplane.

4. The side-edge backlight module as claimed in claim 3, wherein the light guide plate comprises a bottom surface facing the bottom board of the backplane, a top surface arranged opposite to the bottom surface, and a plurality of side surfaces between the bottom surface and the top surface, the plurality of side surfaces including at least a light incidence surface, the backlight source being mounted to the side boards to correspond to the light incidence surface.

5. The side-edge backlight module as claimed in claim 1, wherein the plurality of vertical heat dissipation boards and the horizontal heat dissipation board unit are integrally formed with each other.

6. The side-edge backlight module as claimed in claim 5, wherein the horizontal heat dissipation board unit comprises the same number of horizontal heat dissipation boards as the vertical heat dissipation boards and each of the horizontal heat dissipation boards forming an L-shaped heat dissipation assembly with a corresponding one of the vertical heat dissipation boards.

7. The side-edge backlight module as claimed in claim 5, wherein the horizontal heat dissipation board unit comprises a single horizontal heat dissipation board, the plurality of vertical heat dissipation boards extending from an edge of the horizontal heat dissipation board in a direction substantially perpendicular to the horizontal heat dissipation board.

8. The side-edge backlight module as claimed in claim 1, wherein the horizontal heat dissipation board unit comprises a single horizontal heat dissipation board, the plurality of vertical heat dissipation boards and the horizontal heat dissipation board being formed separately, the plurality of vertical heat dissipation boards being mounted to the circuit board of the backlight source and arranged between the LED lights, the horizontal heat dissipation board being mounted to the backplane, whereby when the circuit board and the horizontal heat dissipation board are mounted to the backplane, the horizontal heat dissipation board and the vertical heat dissipation boards are in contact engagement with each other.

9. The side-edge backlight module as claimed in claim 1 further comprising a reflector plate arranged between the light guide plate and the backplane and an optic film assembly arranged on the light guide plate.

10. The side-edge backlight module as claimed in claim 1, wherein the horizontal heat dissipation board unit and the vertical heat dissipation boards are made of aluminum.

11. A side-edge backlight module, comprising: a backplane, a backlight source mounted in the backplane, and a light guide plate mounted in the backplane, the backlight source comprising a circuit board, a plurality of LED (Light-Emitting Diode) lights mounted to and electrically connected with the circuit board, a plurality of vertical heat dissipation boards mounted to the circuit board and arranged between the LED lights, and a horizontal heat dissipation board unit perpendicularly connected to the vertical heat dissipation boards, the horizontal heat dissipation board unit being mounted on the backplane;
  wherein the horizontal heat dissipation board unit has a surface exposed for dissipating heat;
  wherein the backplane comprises a bottom board and a plurality of side boards perpendicularly connected to the bottom board so that the bottom board and the side boards define a receiving space, the backlight source and the light guide plate being received in the receiving space, the exposed surface of the horizontal heat dissipation board unit being located in the receiving space to dissipate heat into the receiving space of the backplane;
  wherein the circuit board of the backlight source is mounted to the side boards, the horizontal heat dissipation board unit being mounted to the bottom board of the backplane and extending in a direction away from the side boards and into the receiving space of the backplane;
  wherein the light guide plate comprises a bottom surface facing the bottom board of the backplane, a top surface arranged opposite to the bottom surface, and a plurality of side surfaces between the bottom surface and the top surface, the plurality of side surfaces including at least a light incidence surface, the backlight source being mounted to the side boards to correspond to the light incidence surface;
  further comprising a reflector plate arranged between the light guide plate and the backplane and an optic film assembly arranged on the light guide plate; and
  wherein the horizontal heat dissipation board unit and the vertical heat dissipation boards are made of aluminum.

12. The side-edge backlight module as claimed in claim 11, wherein the plurality of vertical heat dissipation boards and the horizontal heat dissipation board unit are integrally formed with each other.

13. The side-edge backlight module as claimed in claim 12, wherein the horizontal heat dissipation board unit comprises the same number of horizontal heat dissipation boards as the vertical heat dissipation boards and each of the horizontal heat dissipation boards forming an L-shaped heat dissipation assembly with a corresponding one of the vertical heat dissipation boards.

14. The side-edge backlight module as claimed in claim 12, wherein the horizontal heat dissipation board unit comprises a single horizontal heat dissipation board, the plurality of vertical heat dissipation boards extending from an edge of the horizontal heat dissipation board in a direction substantially perpendicular to the horizontal heat dissipation board.

15. The side-edge backlight module as claimed in claim 11, wherein the horizontal heat dissipation board unit comprises a single horizontal heat dissipation board, the plurality of vertical heat dissipation boards and the horizontal heat dissipation board being formed separately, the plurality of vertical heat dissipation boards being mounted to the circuit board of the backlight source and arranged between the LED lights, the horizontal heat dissipation board being mounted to the backplane, whereby when the circuit board and the horizontal heat dissipation board are mounted to the backplane, the horizontal heat dissipation board and the vertical heat dissipation boards are in contact engagement with each other.

* * * * *